Patented Jan. 27, 1953

2,626,445

UNITED STATES PATENT OFFICE 2,626,445

HEAVY-METAL OXIDE RESISTORS AND PROCESS OF MAKING SAME

Ernst Albers-Schoenberg, Metuchen, N. J., assignor to Steatite Research Corporation, Keasbey, N. J., a corporation of Delaware No Drawing. Application June 7, 1950,
Serial No. 166,769

5 Claims. (Cl. 25—157)

1

This invention relates to a process of making a metal oxide composition or molded product which has a high resistivity and to the product or composition so produced.

An object of this invention is to provide a metal oxide composition or product which is a semiconductor and has a high negative temperature coefficient of resistance.

Another object of the invention is to provide a metal oxide product having the general formula of approximately $MO.M'_2O_3$ (where M and M' are metals) which has a high resistivity and a high negative temperature coefficient of resistance.

Another object of the invention is to provide a process of making such products.

Several heavy metal oxides, especially the dark colored ones are semi-conductors; their specific resistance ranging between $10^2$ and $10^9$ ohm-cm, measured at room temperature. While the ferro-ferrite $Fe_3O_4$ is a fairly good conductor, the magnesium ferrite $MgOFe_2O_3$ has a very high resistivity. Other compounds as for instance $Ni_3O_4$, $Co_3O_4$, $Mn_3O_4$, $NiO.Fe_2O_3$, $CoO.Fe_2O_3$, $CuO.Fe_2O_2$ and various nickelites and cobaltites show medium values of conductivity somewhere within the above given figures.

Substances of this type are of considerable technical value. They have a high negative temperature coefficient of resistance and are able to serve as protective resistors in thermal time delay applications.

There is, however, a considerable difficulty in the manufacturing of these resistors, especially when it is necessary that the products have a resistance which is uniform and within a certain range. Starting from a mixture of one, two or more of these oxides, molding it to a suitable shape, as for instance small rods, and firing these into a solid and rigid product, the resulting resistivity will vary within wide limits. The smallest variation of the production conditions overthrows any calculation as to the resulting resistivity.

The objects of this invention and other objects ancillary thereto are obtained by mixing the required metallic oxides, molding the oxides to shape (where a certain shaped object is required) and then firing (or first firing) and then further treating) the composition under such conditions as to provide a product with the desired uniformity and the desired resistance properties as more fully described below.

The properties of the oxides mentioned above depend on the content of oxygen within the

2 crystal lattice. The resistivity decreases with increasing deficiency of oxygen. At high temperatures all of the heavy metal oxides have the tendency to lose oxygen by dissociation, a part of which is picked up again during cooling. But if no oxygen is present in the surrounding atmosphere, no oxygen can be picked up and the body emerges from this firing treatment with a relatively low resistivity.

One method of proceeding therefore is as follows: The resistor rods are matured in a firing process under air by which means they are transferred into a state of high resistivity. If they undergo a subsequent firing under neutral gas, the resistivity decreases and it decreases more or less proportionally to the temperature applied. If not all of the resistors reach the desired value after this treatment, the good ones can be selected whereupon the rejected pieces undergo a repetition of the neutral gas firing. This process can be continued, until the whole amount is adjusted to the desired value. The temperature of the refiring steps may be somewhat greater but is usually less than the temperature of the first firing step.

The process is generally applicable to metallic oxide compounds having the general formula $MO.M'_2O_3$ where M is a bivalent heavy metal and M' is trivalent heavy metal. M and M' in the formula may be the same metals. Examples of such compounds include $Ni_3O_4$, $Co_3O_4$, $NiOFe_2O_3$, $CoO.Fe_2O_3$, $CuOFe_2O_3$, $Mn_3O_4$ and the corresponding compounds in which $M'_2O_3$ is $Co_2O_3$ or $Ni_2O_3$ as well as various isomorphous compounds in which the MO and/or the $M'_2O_3$ is made up of two or more metal oxides. Compounds in which the component $M'_2O_3$ is $Fe_2O_3$, $Co_2O_3$ and $Ni_2O_3$ are commonly called ferrites, cobaltites and nickelites, respectively. But it is not necessary that the whole substance consists of compounds of the $MO.M'_2O_3$ type. There may be some uncombined bivalent or trivalent of other oxides in the mixture.

This process is especially efficient, if one of the components is manganese oxide. Even a small amount of only 3 to 6% is sufficient to extend the possible range of resistivity over a range of 4 or 5 orders of magnitude. The effective range for the desired effect of the manganese oxide is between 2 and 12%. Bodies of this kind may have a specific ohmic resistance of $10^8$, fired under oxidizing conditions, and may reach less than $10^4$ after a neutral gas refiring treatment. Any medium value between these limits can be attained by carefully adjusting the temperature.

The amount of oxygen actually lost by the compounds in the treating process of this invention is between .1 and 1.25% and does not change the stoichiometrical proportions of oxygen to metal in the compounds by a large amount. The amount of oxygen lost is not sufficient to change the essential crystal structure of the $MO.M'_2O_3$ compound. As an example, it is estimated that the amount of oxygen by which the compound fails to agree with the exact stoichiometrical proportion might be expressed by the formula $M_3O_{3.95}$ (instead of $M_3O_4$).

Various neutral or inert atmospheres such as atmospheres of nitrogen gas, water vapor, helium gas, etc. may be employed as the oxygen free atmosphere. To be neutral with respect to the compounds treated in this invention the atmosphere does not need to be absolutely free of oxygen. Normal nitrogen usually contains 1 to 3% of oxygen, but it is necessary that the percentage of oxygen be considerably lower than that of air (which is 22%).

The following examples illustrate how the invention is carried out:

Example 1

A ferrite type of body is made by mixing 75% of powdered $Fe_2O_3$, 15% of NiO and 10% of $MnO_2$ and just enough water and plasticizer to make a paste. The body is molded into the form of a rod (as by extruding) and fired at about 1250° C. in an ordinary kiln.

Thereafter the molded product is heated to a temperature below the maturing temperature (about 1150° C.) for 30 minutes in an atmosphere of nitrogen gas and cooled in the same atmosphere. The resistance is measured before and after the second firing treatment.

|  | Before Second Firing | After Second Firing |
| --- | --- | --- |
| Specific Resistance | 2 to 4.10⁸ | 10⁴ |

The same product before the second firing may be given a specific resistance between $2.10^8$ and $10^4$ by dividing the after firing treatment into a number of separate steps of less than 30 minutes each.

Example 2

66% of iron oxide, 14% of nickeloxide, 18% of zinc-oxide and 2% of manganese dioxide are mixed by ballmilling. The slip is dried, and the body after adding a Fe percent of binders, is molded by pressing into little bars, about 10 mm. long and 3 x 3 mm. square.

After firing to about 1220° the pieces show a resistivity of about $3.10^8$ ohm. By refiring them under neutral gas to mild red heat of about 1350° C. a moderate gain in conductivity is achieved, the resistivity now having dropped to about 1 to $3.10^6$ ohms.

If a somewhat lower resistivity is desired the products can be refired in the same neutral atmosphere at the same temperature a second time or at a higher temperature. Also any of the pieces which fail to have the resistance required may be refired in the neutral atmosphere until they attain the required property.

Example 3

The process is conducted as in Example 2 except that the first firing is conducted in a neutral atmosphere of nitrogen. The product of the first firing has a resistivity of approximately $5 \times 10^3$ ohm-cm.

It will be seen that the invention provides resistance elements which have specific resistances that can be adjusted to any one of a number of desirable values and a process of adjusting the resistance values of metal-oxide resistors.

I claim:

1. In a method of making heavy-metal-oxide resistors consisting essentially of a compound of the general formula $MO.M'_2O_3$ in which M is a bivalent form of a metal and M' is a trivalent form of a metal which comprises the steps of mixing bivalent and trivalent metal oxides in substantially the same proportions as indicated by said formula, $MO.M'_2O_3$, and maturing the mixture under oxidizing firing conditions, the improved process which comprises reheating the fired product at a temperature below the maturing temperature in an atmosphere of a neutral gas and cooling the product in a neutral atmosphere whereby the resistivity of the body is decreased by the said reheating and cooling process to a degree dependent upon the time and temperature of said heating process.

2. In a method of making heavy-metal-oxide resistors consisting essentially of a compound of the general formula $MO.M'_2O_3$ in which M is a bivalent form of a metal and M' is a trivalent form of a metal which comprises the steps of mixing bivalent and trivalent metal oxides in substantially the same proportions as indicated by said formula, $MO.M'_2O_3$, molding the mixture to the required form, and maturing the shaped mixture under oxidizing firing conditions, the improved process which comprises reheating the fired product at a temperature which is of the same order as the maturing temperature in an atmosphere of a neutral gas and cooling the product in a neutral atmosphere whereby the resistivity of the body is decreased by the said reheating and cooling process to a degree dependent upon the time and temperature of said heating process.

3. In a method of making heavy-metal-oxide resistors having a general formula of $MO.M'_2O_3$ in which M is a bivalent form of a metal and M' is a trivalent form of a metal and in which at least 2% of the formula is manganese oxide, the steps comprising molding the mixture to the required form, and maturing the shaped mixture under oxidizing firing conditions, reheating the fired product at a temperature below the maturing temperature in an atmosphere of a neutral gas and cooling the product in a neutral atmosphere whereby the resistivity of the body is decreased by the said reheating and cooling process to a degree dependent upon the time and temperature of said heating process.

4. A molded and fired ceramic resistor having a composition which substantially corresponds to $MO.M'_2O_3$ in which M is a bivalent form of a heavy metal and M' is a trivalent form of a heavy metal, said product having a very slight deficiency of oxygen below that of the stoichiometrical formula whereby the specific resistance of said product can be varied from about $10^3$ to $10^8$ ohm-cm. depending on the said deficiency of oxygen.

5. In a process of making a plurality of similar heavy-metal-oxide resistors having substantially identical resistance properties and consisting essentially of a compound of the general formula $MO.M'_2O_3$ in which M is a bivalent form of a metal and M' is a trivalent form of a metal comprising the steps of mixing bivalent and trivalent metal oxides in substantially the same proportions as indicated by said formula, $MO \cdot M'_2O_3$, molding the mixture to form the resistors, maturing the molded products under oxidizing firing conditions, refiring the matured products at approximately the same temperature as the maturing temperature in an atmosphere of a neutral gas, cooling the products in a neutral atmosphere, selectively removing the products which have attained the desired degree of resistance and retreating the remaining products to another refiring process in the presence of a neutral atmosphere.

ERNST ALBERS-SCHOENBERG.

REFERENCES CITED

The following references are of record in the file of this patent:

UNITED STATES PATENTS

| Number    | Name     | Date          |
|-----------|----------|---------------|
| 2,274,592 | Dearborn | Feb. 24, 1942 |
| 2,463,404 | McKinley | Mar. 1, 1949  |
| 2,511,216 | Miller   | June 13, 1950 |